US011338986B2

(12) United States Patent
Leimone

(10) Patent No.: US 11,338,986 B2
(45) Date of Patent: May 24, 2022

(54) DOUBLE-WALLED BEVERAGE CONTAINER AND METHOD OF FORMING THE SAME

(71) Applicant: Pacific Market International, LLC, Seattle, WA (US)

(72) Inventor: John Paul Leimone, Oakland, CA (US)

(73) Assignee: Pacific Market International, LLC, Seattle, WA (US)

( * ) Notice: Subject to any disclaimer, the term of this patent is extended or adjusted under 35 U.S.C. 154(b) by 0 days.

(21) Appl. No.: 16/508,156

(22) Filed: Jul. 10, 2019

(65) Prior Publication Data
US 2020/0017278 A1    Jan. 16, 2020

Related U.S. Application Data

(60) Provisional application No. 62/696,296, filed on Jul. 10, 2018.

(51) Int. Cl.
*A47G 19/22*      (2006.01)
*B65D 81/38*      (2006.01)
(Continued)

(52) U.S. Cl.
CPC ..... *B65D 81/3869* (2013.01); *A47G 19/2255* (2013.01); *B65D 13/02* (2013.01); *B65D 85/72* (2013.01); *B65D 2205/02* (2013.01)

(58) Field of Classification Search
CPC .......... B65D 81/3869; B65D 81/3806; B65D 13/02; B65D 85/72; B65D 2205/02;
(Continued)

(56) References Cited

U.S. PATENT DOCUMENTS

| 1,199,772 A | 10/1916 | Engel |
| RE23,106 E | 5/1949 | Gulick |

(Continued)

FOREIGN PATENT DOCUMENTS

DE    102013107456    * 12/2013    ............ B65D 41/04

OTHER PUBLICATIONS

Tite et al., "An Investigation into the Relationship Between the Raw Materials Used in the Production of Chinese Porcelain and Stoneware Bodies and the Resulting Microstructures" Journal 2012, pp. 37-55, vol. 54, Archaeometry, United Kingdom. Internet Webpage: <URL: http://www.academia.edu/download/41894178/2012_ChinesePorcelain.pdf> [Retrieved Aug. 30, 2019].

(Continued)

*Primary Examiner* — Don M Anderson
*Assistant Examiner* — Elizabeth J Volz
(74) *Attorney, Agent, or Firm* — George C. Rondeau, Jr.; Davis Wright Tremaine LLP

(57) ABSTRACT

Provided are ceramic compositions and containers, in each case comprising a ceramic (e.g., porcelain, stoneware, porcelain, or ceramic composition having properties of both) composition to which an amount of alumina has been added to provide a ceramic composition comprising 20% to 25% (wt./wt.) alumina, preferably about 22% (wt./wt.) alumina, providing a stronger material, such that wall thicknesses (e.g., of double-walled beverage containers) can be reduced or minimized to create a lighter double-walled ceramic container. The disclosed containers have a chemical and porous structure suitable for a wide array of stoneware glazes, and display water absorption rate properties comparable to stoneware. Methods of making same are provided.

19 Claims, 2 Drawing Sheets

(51) Int. Cl.
B65D 85/72 (2006.01)
B65D 13/02 (2006.01)

(58) Field of Classification Search
CPC ............ A47G 19/2255; A47G 19/2288; A47G 19/2205; A47G 19/127; A47J 41/0072; A47J 41/00
USPC .................. 215/12.1, 13.1; 220/592.17, 745
See application file for complete search history.

(56) References Cited

U.S. PATENT DOCUMENTS

| | | | |
|---|---|---|---|
| 2,526,165 | A | 10/1950 | Smith |
| 2,839,209 | A | 6/1958 | Lester |
| 3,827,925 | A | 8/1974 | Douglas |
| 3,993,844 | A | 11/1976 | Kiger et al. |
| 4,928,412 | A | 5/1990 | Nishiyama |
| 4,979,325 | A | 12/1990 | White |
| 5,275,277 | A | 1/1994 | Gallegos |
| 5,398,842 | A | 5/1995 | Sokolski et al. |
| 5,553,735 | A | 9/1996 | Kimura |
| 5,964,102 | A | 10/1999 | Tsai |
| 6,065,609 | A | 5/2000 | Lake |
| 6,119,889 | A | 9/2000 | Fujii et al. |
| 6,163,248 | A | 12/2000 | Paek et al. |
| 6,241,095 | B1 | 6/2001 | Yencheng |
| 6,386,387 | B1 | 5/2002 | Hwang |
| 7,104,413 | B2 | 9/2006 | Liu |
| 7,117,690 | B1 | 10/2006 | Dunn et al. |
| 7,194,951 | B1 | 3/2007 | Porter |
| 7,637,047 | B1 | 12/2009 | Nielson |
| 8,333,296 | B1 | 12/2012 | Fung |
| 8,439,221 | B2 | 5/2013 | Davis |
| 8,770,434 | B2 | 7/2014 | Shearer |
| 9,089,239 | B2 | 7/2015 | Billadeau |
| 9,173,511 | B2 | 11/2015 | Kasha |
| 9,452,876 | B2 | 9/2016 | Anelevitz et al. |
| 9,750,359 | B2 | 9/2017 | Kah, Jr. |
| 9,750,360 | B2 | 9/2017 | Price |
| 10,549,902 | B1 | 2/2020 | Brown, II et al. |
| 2001/0027960 | A1 | 10/2001 | Makino et al. |
| 2005/0194340 | A1 | 9/2005 | Huang |
| 2011/0077176 | A1* | 3/2011 | Smith ..................... C04B 35/58 507/271 |
| 2014/0158699 | A1 | 6/2014 | Kim et al. |
| 2014/0174965 | A1 | 6/2014 | Herling et al. |
| 2016/0068295 | A1 | 3/2016 | Kasha et al. |
| 2016/0183704 | A1* | 6/2016 | Smaldone .......... A47G 19/2288 220/592.17 |
| 2016/0192797 | A1 | 7/2016 | Yang |
| 2016/0345763 | A1 | 12/2016 | Melton |
| 2017/0066573 | A1 | 3/2017 | Karussi et al. |
| 2017/0305594 | A1 | 10/2017 | Kasha |
| 2017/0349331 | A1 | 12/2017 | Choltco-Devlin et al. |
| 2018/0116433 | A1 | 5/2018 | Smaldone et al. |
| 2018/0148376 | A1* | 5/2018 | Ben-Nissan .......... C04B 35/486 |
| 2019/0307292 | A1 | 10/2019 | Haas |
| 2020/0017278 | A1 | 1/2020 | Leimone |

OTHER PUBLICATIONS

United States International Trade Commission, "Harmonized Tariff Schedule of the United States Revision 6: Chapter 69: Ceramic Products," USITC Publication No. 5214, Jul. 2021, 19 pages.

* cited by examiner

DOUBLE-WALLED BEVERAGE CONTAINER AND METHOD OF FORMING THE SAME

CROSS-REFERENCE TO RELATED APPLICATION

This application claims the benefit of U.S. Provisional Patent Application No. 62/696,296, filed Jul. 10, 2018, the disclosure of which is hereby incorporated by reference herein in its entirety.

FIELD OF THE INVENTION

Particular aspects relate generally to improved ceramic materials for manufacture of ceramic pieces (e.g., ceramic containers), and in more particular aspects to double-walled ceramic beverage containers (e.g., double-walled ceramic mugs, etc.) formed from the improved ceramic materials comprising from 20% to 25% (wt./wt.) alumina, and having enhanced strength, reduced weight, and superior glazing properties, relative to prior art ceramic containers.

BACKGROUND

Presently, while ceramic formulas (e.g., stoneware clay body formulas, porcelain clay body formulas, etc.) are used to form functional ceramic pieces (e.g., plates, beverage containers, etc.) that are dense, hard, and vitreous, such ceramic pieces are typically heavy due to the dimensional thickness of materials required to achieve desired strength metrics. For example, typical double wall ceramic mugs (designed with a gap between the walls to provide thermal insulation) are heavy due to the amount/thickness of the ceramic material used in forming the double wall, and are often made of porcelain to increase strength, which reduces the variety of glazes that can be suitably applied.

SUMMARY OF EXEMPLARY ASPECTS OF THE INVENTION

Provided are double-walled beverage containers, comprising: an inner body with an inner body sidewall, the inner body having an upper body end at an upper end portion of the inner body, a lower body end at a lower end portion of the inner body, and an inner body end wall positioned at the lower end portion of the inner body closing the lower end portion of the inner body, the inner body end wall being in fluid-tight engagement with the inner body sidewall at the lower end portion of the inner body; an outer body with an outer body sidewall extending fully about the inner body sidewall, the outer body having an upper body end at an upper end portion of the outer body, a lower body end at a lower body end portion of the outer body, and an outer body end wall positioned at the lower end portion of the outer body closing the lower end portion of the outer body, the outer body end wall being in fluid-tight engagement with the outer body sidewall at the lower end portion of the outer body, the upper end portion of the inner body and the upper end portion of the outer body being rigidly connected together and in fluid-tight engagement and therebelow the outer body sidewall is spaced outward of the inner body sidewall to define a first interior space between the outer and inner body sidewalls, the outer body end wall being positioned below and spaced apart from the inner body end wall to provide a second interior space between the outer and inner body end walls, and at least one of the inner and the outer body sidewalls is formed from a ceramic composition comprising an amount of alumina from 20-25% (wt./wt.). In the beverage containers, both of the inner and outer body sidewalls may be formed from a ceramic composition comprising an amount of alumina from 20-25% (wt./wt.). In the beverage containers, the ceramic composition may, and preferably does comprise alumina at about 22% (wt./wt.). In the beverage containers, the ceramic composition may be that of a stoneware, porcelain, or ceramic composition having properties of both, in each case to which an amount of alumina has been added to provide a ceramic composition comprising 20% to 25% (wt/wt) alumina (e.g., to provide a porous structure suitable for stoneware glazes), preferably about 22% (wt/wt) alumina. In the beverage containers, the ceramic composition may be a stoneware or porcelain composition, in each case to which an amount of alumina has been added to provide a ceramic composition comprising 20% to 25% (wt/wt) alumina (e.g., to provide a porous structure suitable for stoneware glazes), preferably 22% (wt/wt) alumina. Preferably, In the beverage containers, the ceramic composition may be a porcelain composition to which an amount of alumina has been added to provide a ceramic composition comprising about 22% (wt/wt) alumina (e.g., to provide a porous structure suitable for stoneware glazes), preferably 22% (wt/wt) alumina. In the beverage containers, at least one, and preferably both of the inner and outer body sidewalls may be formed from porcelain comprising the amount of alumina, to provide a porous structure suitable for stoneware glazes.

In the beverage containers, the inner body sidewall toward the upper end portion of the inner body may have a first wall thickness, the inner body sidewall toward the lower end portion of the inner body may have a second wall thickness, the outer body sidewall toward the upper end portion of the outer body may have a third wall thickness, the outer body sidewall toward the lower end portion of the outer body may have a fourth wall thickness, and: the first wall thickness may be the same or smaller than the third wall thickness at opposing positions of the inner and outer body sidewalls; and/or the second wall thickness may be the same or smaller than the fourth wall thickness at opposing positions of the inner and outer body sidewalls; and/or the first and second wall thicknesses may be smaller than the third and fourth wall thicknesses at opposing positions of the inner and outer body sidewalk; and/or the first and/or the third wall thicknesses may be tapered between the upper end portions of the inner and outer bodies and the lower end portions of the inner and outer bodies, respectively; and/or and the first and second wall thicknesses may be in a range from about 1.7 to about 2.1 mm; and/or and the third and fourth wall thicknesses may be in a range from about 2.6 to about 3.0 mm, and from about 3.0 to about 4.3 mm, respectively.

In the beverage containers, the inner body end wall has a thickness in the range of 2.8 to 3.2 mm, and/or the outer body end wall has a thickness in the range of 3.8 to 4.2 mm. In the beverage containers, the outer body end wall may comprise a venting orifice feature in an open or in a closed, sealed state.

Additionally provided are methods of forming a beverage container, comprising forming a double-walled beverage container using a ceramic composition comprising an amount of alumina from 20-25% (wt./wt.), preferably about 22% (wt./wt.) alumina. In the methods, the double-walled beverage container may be any of those described or claimed herein. The methods may further comprise glazing of the beverage container with a glaze that would not be chemically suitable but for the amount of alumina.

DETAILED DESCRIPTION OF THE INVENTION

Described below are exemplary embodiments of the present invention. The embodiments illustrate exemplary ways in which the present invention can be implemented. Although the embodiments shown are described in the context of a double-walled beverage container (e.g., mug), the improved ceramic materials can also be used for manufacture of other types of beverage containers. In the descriptions that follow, like numerals represent like elements in the figures. For example, where the numeral 10 is used to refer to a particular element in one figure, the numeral 10 appearing in any other figure refers to the same element.

Double-Walled Containers

Figure 1:
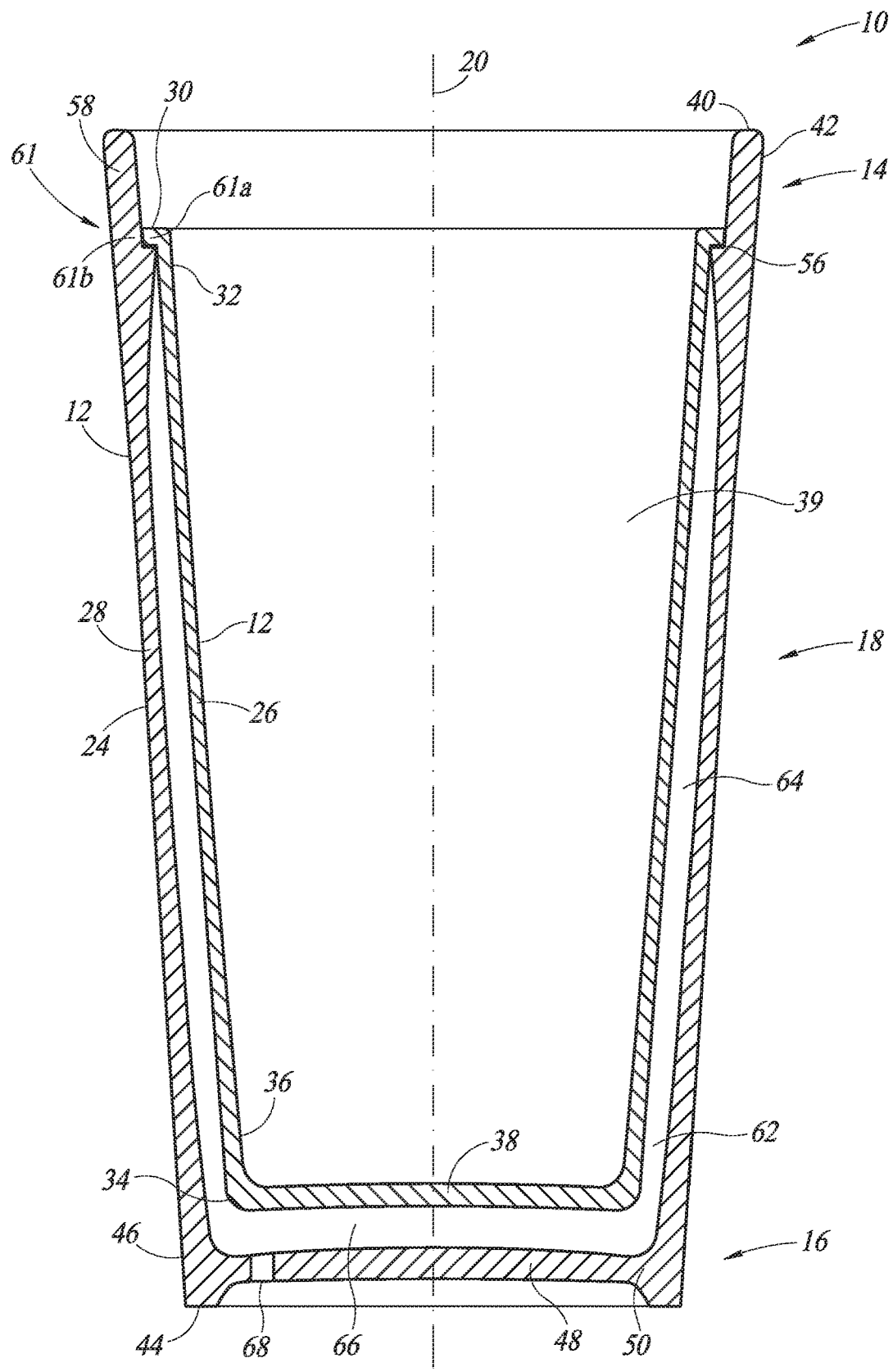
FIG. 1 shows, by way of non-limiting examples of the present invention, a side cross-sectional view of a first embodiment of the invention.

FIG. 1 shows, by way of a non-limiting example of the present invention, a side cross-sectional view of a double-walled beverage contain embodiment of the invention. The drink container 10 has a body 12 with a downwardly tapering profile, with an upper end portion 14 wider than a lower end portion 16 and a mid-portion 18 extending therebetween. If desired, the beverage container 10 may be constructed with a substantially cylindrical body. The illustrated beverage container 10 has no handle or lid, but other forms of the container may include a handle and/or a lid.

The body 12 is elongated and has a vertically oriented central axis 20. As shown in FIG. 1, the body 12 has a double-walled construction, with an inner body 22 positioned inward of and within an outer body 24. The inner body 22 has an inner body sidewall 26 and the outer body 24 has an outer body sidewall 28. The inner body sidewall 26 and the outer body sidewall 28 extend fully and symmetrical about the longitudinal axis 20.

The inner body 22 has an upper body end 30 at an upper end portion 32 of the inner body and a lower body end 34 at a lower end portion 36 of the inner body. An inner body end wall 38 closes the lower end portion 36 of the inner body 22 and is in fluid-tight engagement with the inner body sidewall 26 at the lower end portion 36 of the inner body, to define an upwardly opening interior cavity 39 of the inner body for holding a beverage or other substances, materials or items (not shown) therein when the beverage container 10 is in an upright position.

The outer body 24 has an upper body end 40 at an upper end portion 42 of the outer body and a lower body end 44 at a lower end portion 46 of the outer body. An outer body end wall 48 closes the lower end portion 42 of the outer body 24. The outer body end wall 48 has an outer edge portion 50 and is in fluid-tight engagement with the outer body sidewall 28 at the lower end portion 46 of the outer body 24. In a preferred embodiment, the inner body 22 and the outer body 24 are formed as a unitary structure.

While the inner body sidewall 26 and the outer body sidewall 28 are circular in cross-section, other shapes may be used for the inner body 22 and outer body 24. Similarly, while the inner body end wall 30 and the outer body end wall 48 are generally circular in shape, they may have other shapes which conform, respectively, to the shapes of the lower end portion 36 of the inner body 22 and to the lower end portion 46 of the outer body 24.

Figure 2:
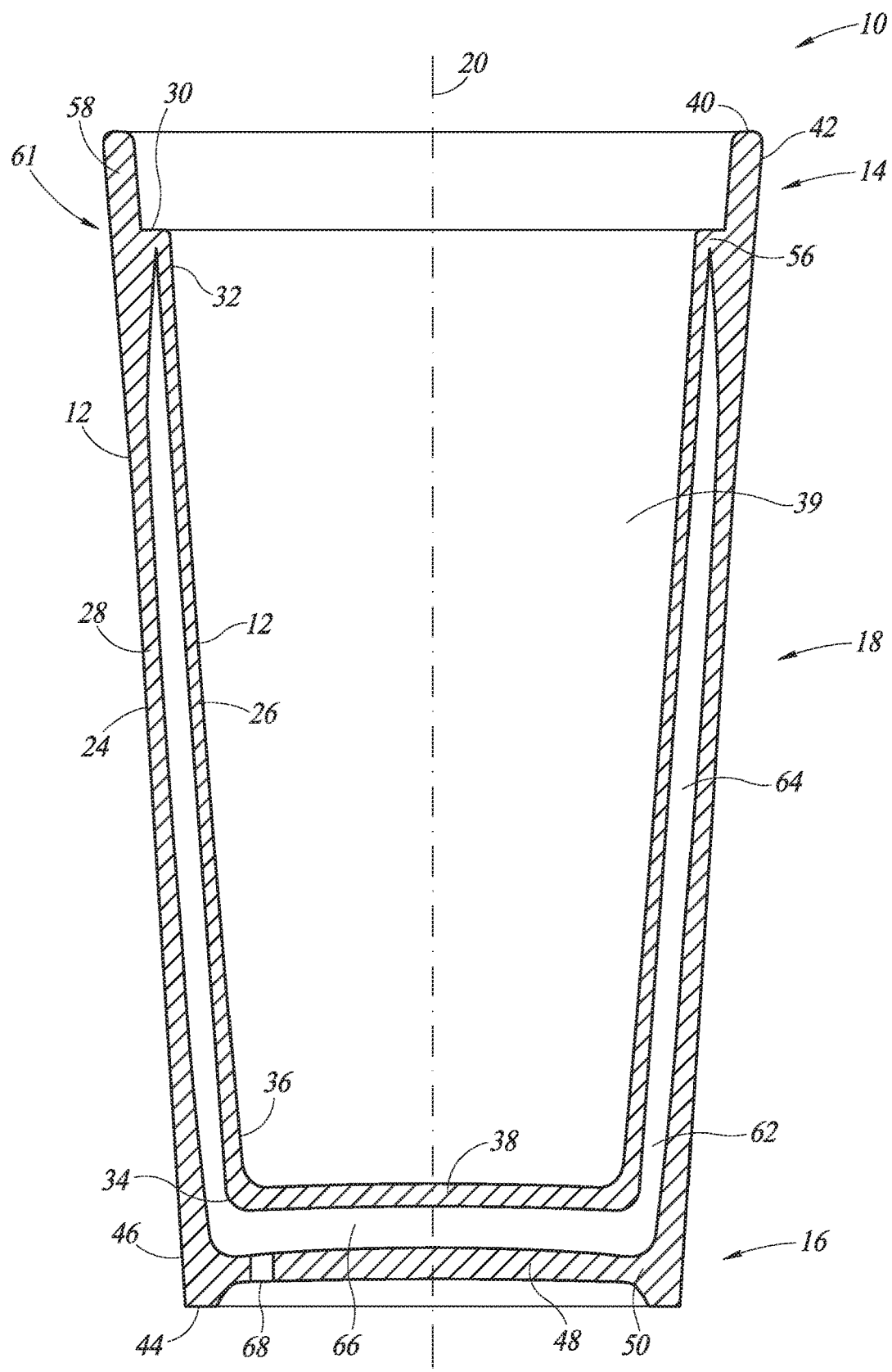
FIG. 2 shows, by way of non-limiting examples of the present invention, a side cross-sectional view of second embodiment of the invention.

The upper end portion 32 of the inner body 22 at the upper body end 30 is rigidly connected to and in fluid-tight engagement with the upper end portion 42 of the outer body 24 at a location 56 below the upper body end 40 of the outer body. In the illustrated embodiment, the inner body 22 and the outer body 24 are made of a ceramic body formula (e.g., porcelain, stoneware, porcelain, or ceramic composition having properties of both) composition to which an amount of alumina has been added to provide a ceramic composition comprising 22% (wt./wt.) alumina (in this instance, a porcelain body formula to which an amount of alumina has been added to provide a ceramic composition comprising 22% (wt./wt.) alumina was used). The rigid connection and fluid-tight engagement are accomplished by attaching (e.g., fusing in a firing kiln) the upper end portion 32 of the inner body to the upper end portion 42 of the outer body. In effect this forms an annular connector portion 61 having an outer edge portion 61a in fluid-tight engagement with the outer body sidewall 28 and an inward edge portion 61b in fluid-tight engagement with the inner body sidewall 26. As shown in FIGS. 1 and 2, a portion 58 of the upper end portion 42 of the outer body 24 extends upward beyond the location 56 whereat the upper end portion 32 of the inner body 22 is connected to the upper end portion 42 of the outer body 24.

The inner body end wall 38 which closes the lower body end 36 of the inner body 22 is located above and spaced-apart from the outer body end wall 48 which is at the lower end portion 46 of the outer body 24.

An interior space 62 is defined between the inner body sidewall 26 and the inner body end wall 38, on one hand, and the outer body sidewall 28 (at least the portion below the location 56), and the outer body end wall 48, on the other hand. The interior space 62 includes a first interior space portion 64 and a second interior space portion 66. The first interior space portion 64 extends circumferentially about the inner body sidewall 26, between the inner body sidewall and the outer body sidewall 28, and longitudinally from the location 56 whereat the upper end portion 32 of the inner body 22 is connected to the upper end portion 42 of the outer body 24, to the outer body end wall 48. The second interior space portion 66 is located below the inner body end wall 38, between the inner body end wall and outer body end wall 48. The outer body end wall 30 includes a venting orifice 68 in fluid communication with the interior space 62 during kiln drying of the drink container 10, but afterward is sealed to maintain the interior space as a dry hollow fluid-tight chamber during normal usage of the drink container. In this embodiment, the venting orifice 24 feature is shown in the open state.

The exemplary embodiment of FIG. 1 was fired at 1,210° C. to 1230° C. using an oxidation atmosphere kiln firing, resulting in a translucent, white to off-white product having a water absorption rate of about 0.9% (wt) (e.g., in the range of 0.9% to 1.1% (wt) (Harmonized Tariff Schedule of the United States (2015)). The weight of the fired product (having a top outer diameter of about 87 cm and a lower outer diameter of about 65 cm) was about 430 g (e.g., preferred weight range is 423-430 g).

In alternative embodiments, at least one of the outer and/or the inner container walls (and preferably both) is formed from a ceramic (e.g., stoneware, porcelain, or ceramic composition having properties of both) composition, in each case to which an amount of alumina has been added to provide a ceramic composition comprising 20% to 25% (wt./wt.) alumina, preferably about 22% (wt./wt.) alumina.

FIG. 2 shows, by way of an additional non-limiting example of the present invention, a side cross-sectional view of a double-walled beverage container 10 embodiment of the invention. As in the embodiment of FIG. 1, the inner body 22 and the outer body 24 are made of a ceramic (e.g., porcelain, stoneware, porcelain, or ceramic composition having properties of both) composition to which an amount of alumina has been added to provide a ceramic composition comprising 22% (wt./wt.) alumina (in this instance, a porcelain body formula to which an amount of alumina has been added to provide a ceramic composition comprising 22% (wt./wt.) alumina was used). The rigid connection and fluid-tight engagement are accomplished by attaching (e.g., fusing in a firing kiln) the upper end portion 32 of the inner body to the upper end portion 42 of the outer body. In this embodiment, an integral (i.e., outer edge portion 61a and 61b of FIG. 1 have been fused to provide an integral annular connector portion 61 in FIG. 2) annular connector portion 61 is formed, and otherwise the features of the embodiment of FIG. 2 are identical to those of FIG. 1.

The exemplary embodiment of FIG. 2 was also fired at 1,210° C. to 1230° C. using an oxidation atmosphere kiln firing, resulting in a translucent, white to off-white product having a water absorption rate of about 0.9% (wt) (e.g., in the range of 0.9% to 1.1% (wt). The weight of the fired product (having a top outer diameter of about 87 cm and a lower outer diameter of about 65 cm) was about 430 g (e.g., preferred weight range is 423-430 g).

In alternative embodiments, at least one of the outer and/or the inner container walls (and preferably both) is formed from a ceramic (e.g., stoneware, porcelain, or ceramic composition having properties of both) composition, in each case to which an amount of alumina has been added to provide a ceramic composition comprising 20% to 25% (wt./wt.) alumina, preferably about 22% (wt./wt.) alumina.

Improved Ceramic Materials

According to particular aspects of the invention, the use of a ceramic (e.g., porcelain, stoneware, porcelain, or ceramic composition having properties of both) composition to which an amount of alumina has been added to provide a ceramic composition comprising 20% to 25% (wt./wt.) alumina, preferably about 22% (wt./wt.) alumina, provides a stronger material, such that the wall thicknesses of double-walled containers can be reduced to create a lighter double-walled ceramic container, thus overcoming a limitation of the prior art. Preferably, a porcelain body formulation composition to which an amount of alumina has been added to provide a ceramic composition comprising about 22% (wt./wt.) alumina is used. Preferably the wall thicknesses in the double-walled containers are greater than 1.6 mm.

According to additional aspects of the invention, the use of a ceramic (e.g., porcelain, stoneware, porcelain, or ceramic composition having properties of both) composition to which an amount of alumina has been added to provide a ceramic composition comprising 20% to 25% (wt./wt.) alumina, preferably about 22% (wt./wt.) alumina in the double-walled containers, provides a chemical and porous structure suitable for a wide array of stoneware glazes that otherwise would not be chemically suitable, thus overcoming an additional limitation of the prior art. Preferably, a porcelain body formulation composition to which an amount of alumina has been added to provide a ceramic composition comprising about 22% (wt./wt.) alumina is used.

According to further aspects of the invention, the use of a ceramic (e.g., porcelain, stoneware, porcelain, or ceramic composition having properties of both) composition to which an amount of alumina has been added to provide a ceramic composition comprising 20% to 25% (wt./wt.) alumina, preferably about 22% (wt./wt.) alumina in the double-walled containers, provides a chemical and porous structure which provides water absorption properties that resemble stoneware. Preferably, as discussed in relation to FIGS. 1 and 2, a porcelain body formulation composition to which an amount of alumina has been added to provide (e.g., fired at 1,210° C. to 1230° C. using a oxidation atmosphere kiln firing) a ceramic composition comprising about 22% (wt./wt.) alumina, resulting in a translucent, white to off-white product having a water absorption rate of about 0.9% (wt) (e.g., in the range of 0.9% to 1.1% (wt).

Comparative properties of different traditional ceramic materials are shown in Table 1 below (e.g., based on Harmonized Tariff Schedule of the United States (2015); Chapter 69; ceramic products). The water absorption rate of the ceramic compositions used in the beverage containers disclosed and/or claimed herein, is preferably about 0.9% (e.g., 0.7% to 1.1%), resembling the water absorption rate of traditional stoneware.

TABLE 1

Comparative properties of different traditional ceramic materials.

| Ceramic composition | Water absorption rate (% wt/wt) | Translucent/ Opaque | Whiteness |
|---|---|---|---|
| Porcelain, china, chinaware | 0%-0.5% | translucent | White |
| Stoneware | 0.5%-3% | Opaque | Commonly not white |
| Earthenware | Above 3% | Opaque | Not white |

Ceramic body formulas (e.g., stoneware clay body formulas (e.g., for bodies fired between 1,210° C. (2,210° F.) and 1,230° C. (2,246° F.)) are known and used in the art for creating dense, hard, vitreous, functional pieces of pottery, and typically comprise a mixture of clays, fluxes (e.g., used to lower melting point of heat-resistant clays and fillers, and increase glass formation) and fillers (e.g., used to reduce shrinkage and warping). Typical clays used in stoneware clay body formulas are high-temperature refractory clays (e.g., stoneware clays, fire clays, ball clays, kaolins (plastic and non-plastic), and bentonites). Typical fluxes in stoneware clay body formulas include feldspars (e.g., soda, potash and lithium). Typical fillers in stoneware clay body formulas include flint, pyrophyllite, silica sand, sawdust, mullite, calcined kaolin, kyanite, calcined alumina, and grogs of various sizes. Various additives (e.g., bentonites, ball clays, organic agents, Epsom salts and lignosulfonates) may be added to modulate plasticity of the stoneware clay body formulas.

Likewise porcelain body formulas (e.g., for bodies fired between 1,340° C. (2,444° F.) and 1,360° C. (2,480° F.)), characteristically comprising kaolin, are known in the art. Porcelain formulas can be based on stoneware formulas and typically contain a combination of clay, kaolin (kaolinite; a primary clay known for its translucency), feldspar, silica and quartz, and where optionally, other materials may be added (e.g., ball clay, bone ash, steatite, petunstse, alabaster, etc.).

Preferred Methods of Forming the Double-Walled Containers

Preferably, greenware parts (e.g., the inner and the outer ceramic body walls) are formed using a jiggering machine with solid clay compositions as discussed herein, followed by kiln firing (e.g., fired at 1,210° C. to 1230° C. using a oxidation atmosphere kiln firing) and forming the rigid connection between the upper end portion 32 of the inner body 22 at the upper body end 30 and the upper end portion 42 of the outer body 24 at a location 56 below the upper body end 40 of the outer body.

Table 2 shows typical firing kiln conditions suitable for traditional stoneware and porcelain body formulas, along with preferred firing kiln conditions for the presently disclosed ceramic (e.g., porcelain, stoneware, porcelain, or ceramic composition having properties of both) compositions to which an amount of alumina has been added to provide a ceramic composition comprising 20% to 25% (wt./wt.) alumina, preferably about 22% (wt./wt.) alumina.

TABLE 2

Firing Kiln Conditions.

| Body Formula | Firing Temp | Duration in Kiln | Decal Firing Temp | Duration in Kiln |
|---|---|---|---|---|
| Stoneware | 1210° C.-1230° C. | 14-18 hr. | 750° C.-850° C.; depending on the decal material | 4-5 hr. |
| Porcelain | 1340° C.-1360° C. | 14-18 hr. | | 3-4 hr. |
| 22% Alumina compositions as disclosed herein | 1230° C. | 14-18 hr. | | 4-5 hr. |

One of ordinary skill in the art will, based on the present disclosure, recognize that the improved disclosed double-walled containers may be formed using other suitable ceramic methods, provided that the ceramic compositions employed comprise a ceramic (e.g., porcelain, stoneware, porcelain, or ceramic composition having properties of both) composition to which an amount of alumina has been added to provide a ceramic composition comprising 20% to 25% (wt./wt.) alumina, preferably about 22% (wt./wt.) alumina. Preferably, stoneware or porcelain body formulas to which an amount of alumina has been added to provide a ceramic composition comprising 20% to 25% (wt./wt.) alumina, preferably about 22% (wt./wt.) alumina, are used in the methods.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

The invention claimed is:

1. A double-walled beverage container, comprising:
an inner body with an inner body sidewall, the inner body having an upper body end at an upper end portion of the inner body, a lower body end at a lower end portion of the inner body, and an inner body end wall positioned at the lower end portion of the inner body closing the lower end portion of the inner body, the inner body end wall being in fluid-tight engagement with the inner body sidewall at the lower end portion of the inner body;
an outer body with an outer body sidewall extending fully about the inner body sidewall, the outer body having an upper body end at an upper end portion of the outer body, a lower body, end at a lower body end portion of the outer body, and an outer body end wall positioned at the lower end portion of the outer body closing the lower end portion of the outer body, the outer body end wall being in fluid-tight engagement with the outer body sidewall at the lower end portion of the outer body, the upper end portion of the inner body and the upper end portion of the outer body being rigidly connected together and in fluid-tight engagement and therebelow the outer body sidewall is spaced outward of the inner body sidewall to define a first interior space between the outer and inner body sidewalls, the outer body end wall being positioned below and spaced apart from the inner body end wall to provide a second interior space between the outer and inner body end walls, and
at least one of the inner and the outer body sidewalls is formed from a ceramic composition comprising an amount of alumina from 20-25% (wt./wt.).

2. The beverage container of claim 1, wherein both of the inner and outer body sidewalk are formed from the ceramic composition comprising the amount of alumina from 20-25% (wt./wt.).

3. The beverage container of claim 1, wherein the ceramic composition comprises alumina at about 22% (wt./wt.).

4. The beverage container of claim 1, wherein the ceramic composition is that of a stoneware, porcelain, or ceramic composition having properties of both, in each case to which an amount of alumina has been added to provide a ceramic composition comprising 20% to 25% (wt./wt.) alumina, to provide a porous structure suitable for stoneware glazes.

5. The beverage container of claim 4, wherein the ceramic composition is that of a stoneware, porcelain, or ceramic composition having properties of both, in each case to which an amount of alumina has been added to provide a ceramic composition comprising about 22% (wt./wt.) alumina, to provide a porous structure suitable for stoneware glazes.

6. The beverage container of claim 4, wherein the ceramic composition is a stoneware or porcelain composition, in each case to which an amount of alumina has been added to provide a ceramic composition comprising 20% to 25% (wt./wt.) alumina, to provide a porous structure suitable for stoneware glazes.

7. The beverage container of claim 6, wherein the ceramic composition is a stoneware or porcelain composition, in each case to which an amount of alumina has been added to provide a ceramic composition comprising about 22% (wt./wt.) alumina.

8. The beverage container of claim 7, wherein the ceramic composition is a porcelain composition to which an amount of alumina has been added to provide a ceramic composition comprising about 22% (wt./wt) alumina.

9. The beverage container of claim 1, wherein both the inner and outer body sidewalls are formed from a porcelain composition to which the amount of alumina has been added, to provide a porous structure suitable for stoneware glazes.

10. The beverage container of claim 1, wherein the inner body sidewall toward the upper end portion of the inner body has a first wall thickness, the inner body sidewall toward the lower end portion of the inner body has a second wall thickness, the outer body sidewall toward the upper end portion of the outer body has a third wall thickness, the outer body sidewall toward the lower end portion of the outer body has a fourth wall thickness, and the first wall thickness being the same or smaller than the third wall thickness at opposing positions of the inner and outer body sidewalls.

11. The beverage container of claim 1, wherein the inner body sidewall toward the upper end portion of the inner body has a first wall thickness, the inner body sidewall toward the lower end portion of the inner body has a second wall thickness, the outer body, sidewall toward the upper end portion of the outer body has a third wall thickness, the outer body sidewall toward the lower end portion of the outer body has a fourth wall thickness, and the second wall thickness being the same or smaller than the fourth wall thickness at opposing positions of the inner and outer body sidewalk.

12. The beverage container of claim 1, wherein the inner body sidewall toward the upper end portion of the inner body has a first wall thickness, the inner body, sidewall toward the lower end portion of the inner body has a second wall thickness, the outer body sidewall toward the upper end portion of the outer body has a third wall thickness, the outer body sidewall toward the lower end portion of the outer body has a fourth wall thickness, and the first and second wall thicknesses are smaller than the third and fourth wall thicknesses at opposing positions of the inner and outer body sidewalls.

13. The beverage container of claim 1, wherein the inner body sidewall toward the upper end portion of the inner body has a first wall thickness, the inner body sidewall toward the lower end portion of the inner body has a second wall thickness, the outer body sidewall toward the upper end portion of the outer body has a third wall thickness, the outer body sidewall toward the lower end portion of the outer body has a fourth wall thickness, and the first and/or the third wall thicknesses are tapered between the upper end portions of the inner and outer bodies and the lower end portions of the inner and outer bodies, respectively.

14. The beverage container of claim 1, wherein the inner body sidewall toward the upper end portion of the inner body has a first wall thickness, the inner body sidewall toward the lower end portion of the inner body has a second wall thickness, the outer body sidewall toward the upper end portion of the outer body has a third wall thickness, the outer body sidewall toward the lower end portion of the outer body has a fourth wall thickness, and the first and second wall thicknesses are in a range from about 1.7 to about 2.1 mm.

15. The beverage container of claim 1, wherein the inner body sidewall toward the upper end portion of the inner body has a first wall thickness, the inner body sidewall toward the lower end portion of the inner body has a second wall thickness, the outer body, sidewall toward the upper end portion of the outer body has a third wall thickness, the outer body, sidewall toward the lower end portion of the outer body has a fourth wall thickness, and the third and fourth wall thicknesses are in a range from about 2.6 to about 3.0 mm, and from about 3.0 to about 4.3 mm, respectively.

16. The beverage container of claim 1, wherein the outer body end wall comprises a venting orifice feature in an open or in a closed, sealed state.

17. The beverage container of claim 1, wherein the inner body end wall has a thickness in the range of 2.8 to 3.2 ram.

18. The beverage container of claim 1, wherein the outer body end wall has a thickness in the range of 3.8 to 4.2 mm.

19. The beverage container of claim 1, wherein the ceramic composition has a water absorption rate in the range of 0.9% to 1.1% (wt./wt.).

* * * * *